G. W. BELL.
CUSHION TIRE.
APPLICATION FILED NOV. 8, 1918.

1,414,325.

Patented Apr. 25, 1922.
4 SHEETS—SHEET 1.

INVENTOR
George William Bell,
BY
ATTORNEYS

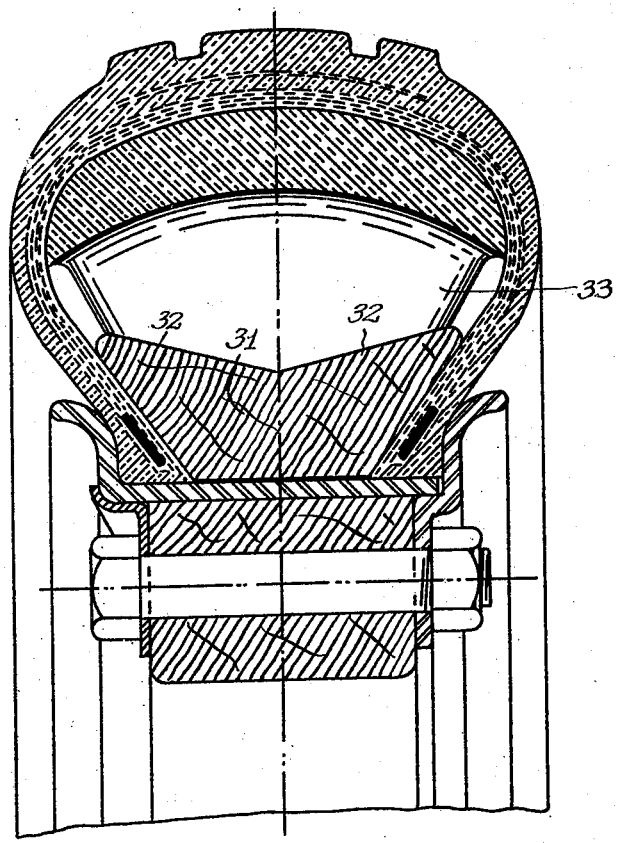

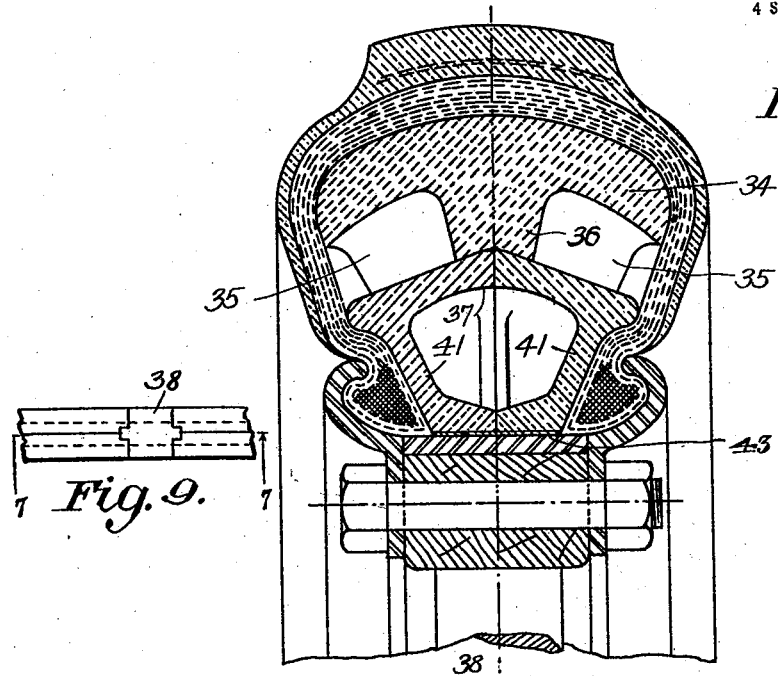
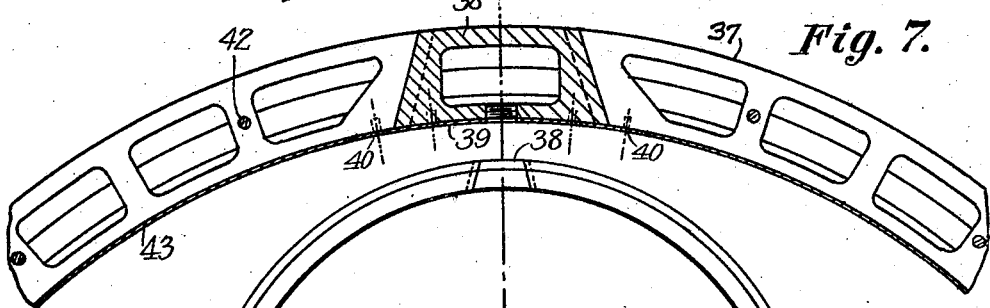
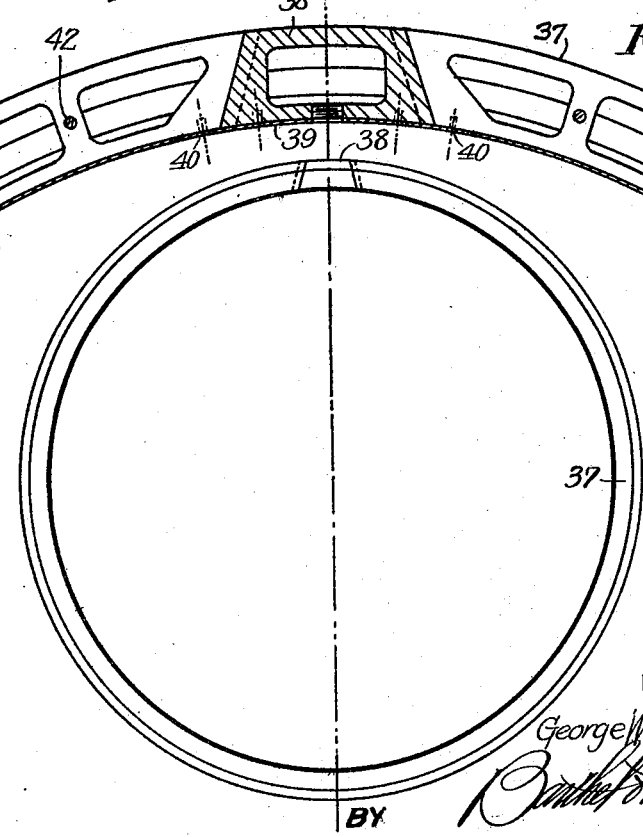

UNITED STATES PATENT OFFICE.

GEORGE WILLIAM BELL, OF DETROIT, MICHIGAN.

CUSHION TIRE.

1,414,325.  Specification of Letters Patent. Patented Apr. 25, 1922.

Application filed November 8, 1918. Serial No. 261,590.

*To all whom it may concern:*

Be it known that I, GEORGE WILLIAM BELL, a subject of the King of Great Britain, residing at Detroit, in the county of Wayne and State of Michigan, have invented certain new and useful Improvements in Cushion Tires, of which the following is a specification, reference being had therein to the accompanying drawings.

In the construction and use of cushion tires, particularly on service vehicles, it is necessary, of course, that the tread portion be as tough as possible to resist the frictional wear with the road surface, while at the same time it must be competent to transmit the driving torque. The core of the tire should be as elastic as possible to absorb vibration, and provision should be made to overcome the excessive heating that occurs in the mass of elastic material that is as rapidly compressed as is a cushion tire when the vehicle on which it is mounted is traveling rapidly. It is also desirable that the compression be so directed as to prevent any tendency of the tire to roll sidewise on the rim, and it is also advisable and in fact necessary to provide means for eliminating any friction between the interior body of the tire and the outer casing thereof if the tire be built up of parts, so that the softer interior which is readily friable, does not become rapidly disintegrated.

This invention relates to a cushion tire wherein the road wear is taken by a suitable exterior casing that is of proper quality to transmit the driving torque of the vehicle, and which may be replaced when worn out, while the interior is formed of an elastic core of much softer material than the tread, correspondingly more compressible, with a supporting means therefor which not only causes the shocks of the road to be transmitted in a line substantially perpendicular to the bearing surface of the tire support, but also will prevent any tendency of the tire to roll sidewise, as when rounding corners or making any turns. Another feature of the tire is a support therefor which rapidly disseminates and conducts away the heat which is usually generated in the tire core by the rapid alternate compression and relaxation of the elastic core as the car is driven far under load. There are other features also which include the means for retaining the parts in position and for eliminating any possibility of erosion of the interior from contact with the outer casing.

The invention consists in the matters hereinafter set forth, and more particularly pointed out in the appended claims.

In the drawings,

Fig. 5 is a view of a modification of the core receiving peripheral face of the filler;

Fig. 6 is a view in cross section of the tire fitted with a preferred form of core and base ring;

Fig. 7 is a view in detail of a section of the latter ring, the view being a section taken on line 7—7 of Fig. 9;

Fig. 8 is a view showing such ring locked in expanded position; and

Fig. 9 is a view in detail of a ring expanding block.

Figure 3:
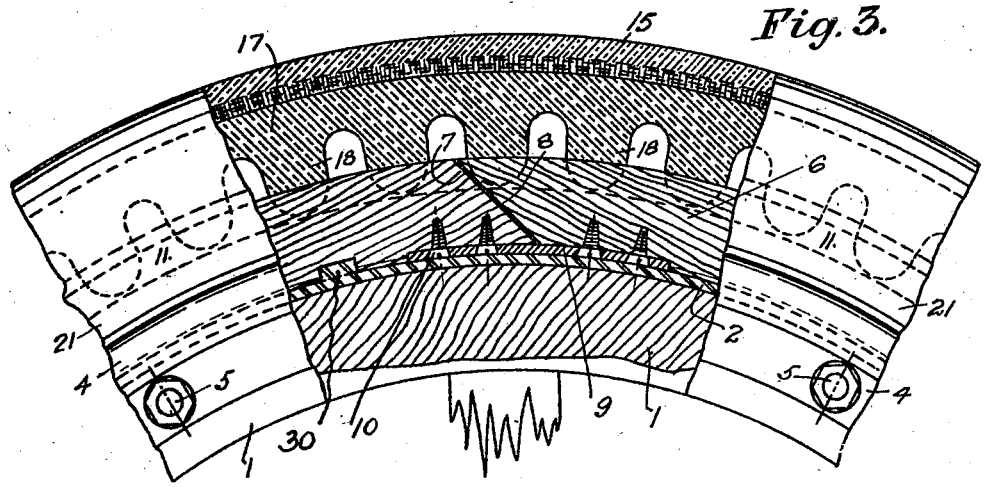
Fig. 3 is a view in side elevation, partially broken away and in section, showing the tire of Fig. 1.
Figure 4:
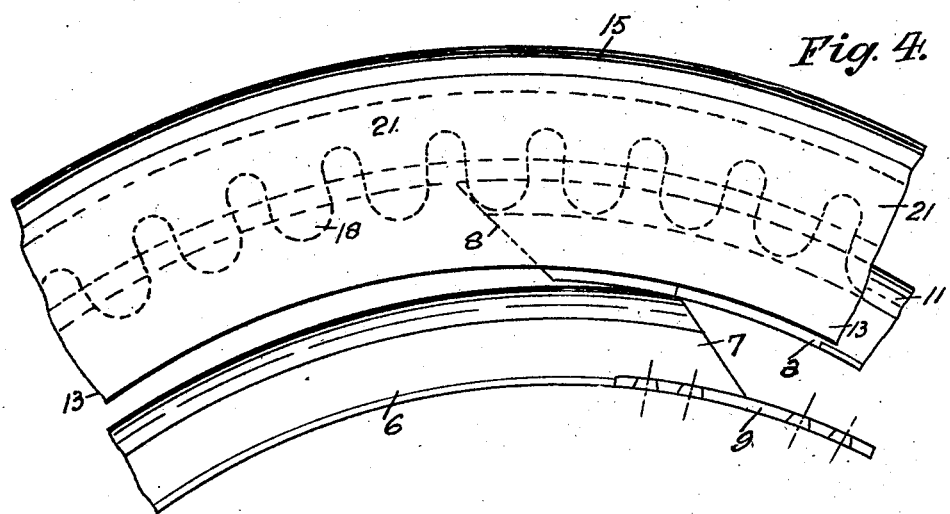
Fig. 4 is a view in side elevation of the portion shown in Fig. 3 with the parts in position ready for the expansion of the filler after placing the same in the casing.

Referring to the drawings, a felly 1 carries a rim 2 having one permanent flange 3 and an applied flange 4 held thereto by suitable bolts 5 or the like passing through the felly. On the periphery of the rim 2 a driving boss indicated by a dotted line 30 in Fig. 1 and at 30 in Fig. 3 is formed to enter a corresponding recess in an annular base ring 6 which may be either of wood, hollow hard rubber or pressed out of sheet metal. The base ring is of substantially the contour indicated and is split so that the end portions 7 and 8 thereof may be brought into overlapped relation as indicated in Fig. 4 and may be secured in expanded position, as by an applied holding plate 9 and screws 10. The outer face of the base ring 6 is provided with a pair of sloping faces 11 forming a transversely beveled periphery, and divergent side faces 12. The latter cooperate with the flanges 3 and 4 to retain the enlarged or thickened margins 13 of an outer casing 14 having a tread portion 15 of preferred design and inelastic retaining rings 16 near each margin.

Figure 1:
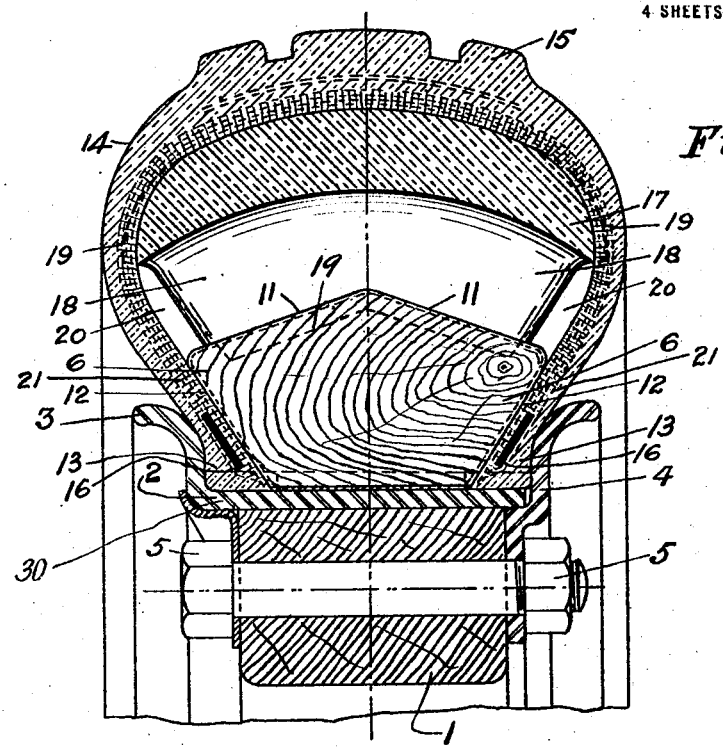
Figure 1 is a view in cross section through a tire that embodies features of the invention, together with the supporting rim.

An endless annular core member of soft rubber suitably elastic, has a crescent-sectioned body 17 that is held in a substantially concentric relation with the faces 11 of the base ring by a number of inwardly extending radial lugs or pillars 18. The side faces of the pillars 18 are preferably rounded as indicated in Figs. 1 and 4 and are likewise conformed to the faces 11 of the base ring 6. The dotted lines 19 in Fig. 1 indicate the contour in cross section of the core member 17 before its application to the split annulus 6 and the expansion of the latter, together with the compression afforded by the casing 14.

In assembling the device the split annulus is disposed as indicated in Fig. 4 and the core 17 applied thereto, the diameter of the latter being normally considerably less than that of the fully expanded member 6. Then the casing is placed over the two parts and the annulus expanded as indicated in Fig. 4. The whole is then slipped upon the rim 2 and the holding flange 4 applied. As a result of the expansion of the base ring and the contraction of the casing when clamped home, the core takes the position and contour indicated in Fig. 3. It is to be noted that the cross-sectional dimension of the pillars 18 is such that there is a clear space indicated at 20 on each side of the pillars and between the latter and the sides of the casing. The parts are furthermore so proportioned that the sides of the annulus 6 are sufficiently wide to extend well beyond the outturned margins of the flanges 3 and 4, thereby affording wider bearing faces for the inner faces of the sides 21 of the tire casing than is given by the rim flanges 3 and 4 to the outer faces of the casing sides. As a consequence, under compression, the casing always tends to spring away or outwardly from the core and thereby prevent any erosion of the latter.

Figure 2:
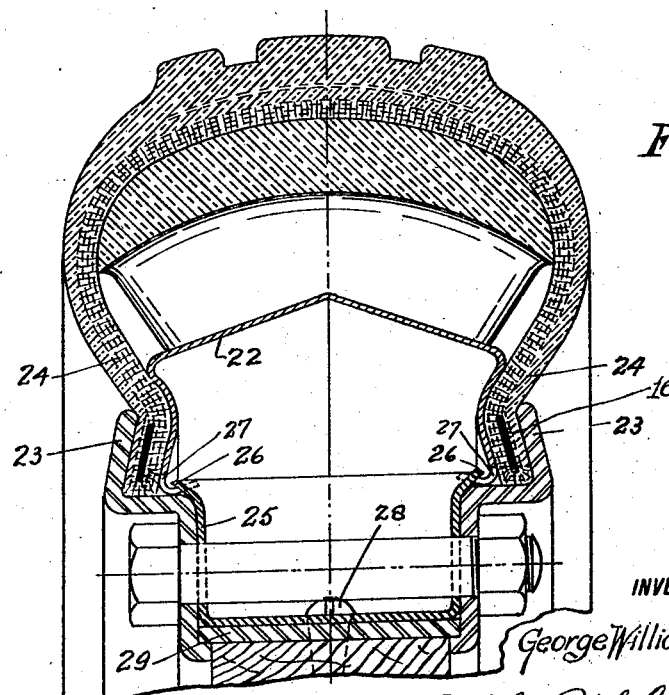
Fig. 2 is a view in cross section showing a slight modification of the tire.

The structure may be modified as indicated in Fig. 2 wherein the annulus is replaced by a hollow metal member 22 and the guide flanges of the rim may take the form indicated at 23. The casing is correspondingly formed as indicated at 24.

As a further detail of construction, the flanges 23 have wider contact with the casing than those indicated in Fig. 1 and enclose a plurality of hollow bosses 25 having margins 26 that interlock with the corresponding notched marginal portions 27 of the base 22. These bosses are secured as by holding screws 28 to the rim 29 of the wheel.

In the modification shown in Figs. 6 to 9 inclusive, a preferred modification of the core is shown. In such form, the annular body 34 of the core is carried by spaced transverse pillars 35 connected by a central annular rib 36 which rests on the meeting faces of the beveled periphery of the base ring 37.

In order to avoid too great movement of the end portion of the split base ring, it may take the form shown in Figs. 6 to 9 inclusive in which a filler block 38 is inserted between the inclined end faces of the ring, a groove and tongue arrangement preventing side slip, and a retaining plate 39 and screws 40, or the like holding the parts together. This construction tends to avoid material displacement of lugs of the core belt in a circumferential direction, since the movement of the split ring during expansion is not of the character shown in Fig. 4, in which more or less of a circumferential contact and movement takes place, tending to shift lugs 18 out of their true positions. The base ring may likewise be molded of hard rubber in oppositely-disposed sections 41 secured together by transverse bolts 42, a metallic liner 43 insuring a good fit on the felloe.

As will be seen, the ring and casing of each form are proportioned to maintain both stress and compression on the core, the core being dimensioned to provide clearance between the sides thereof and the marginal portions of the casing, the core constituting a minor portion of the radial dimension thickness of the assembled structure formed by the casing, core, core support and rim.

As a result of this construction, a cushion tire is obtained which entirely obviates any tendency to side roll because of the peculiar bearing surface of the inner support, the tough outer casing giving the proper road wearing qualities and transmitting the torque to the wheel while the very elastic inner core, compressed as it is to a certain extent into the position which is found best to prevent erosion from rapid compression and friction with the casing, transmits the direct stresses in lines that are substantially perpendicular to the supporting surfaces, while all side thrusts are likewise imparted along lines normally vertical to this bearing surface, thus eliminating lateral shearing effects on the pillars.

Furthermore, if the ring is of metal, it rapidly conducts away the heat which is generated by the rapid compression to which the core is subjected. It is to be understood that the various faces that are in contact may be appropriately lined, if desired.

Furthermore by proper dimensioning of the base ring and filler, any desired initial compression may be imposed upon the filler to render the tire suitable for any load or speed within the range of the tire.

Again, as indicated in the modified form of Fig. 5, there may be a base ring 31 having sloping faces 32 which form a dished surface on which the complementarily formed pillars 33 of the filler rest.

Obviously, changes in the details of construction may be made without departing from the spirit of my invention and I do not care to limit myself to any particular form or arrangement of parts.

What I claim is:—

1. In a cushion tire, an outer casing of a substantially inelastic fabric, segmental sections adapted when assembled to form a base ring to engage on a wheel rim, and to confine the marginal portions of the casing thereto, the outer face of the applied ring being wider than the inner periphery and being transversely beveled, and an annular elastic core consisting of an outer continuous portion having an outer contour substantially conforming to the casing, and a plurality of radially disposed lugs on the inner face of the outer portion resting on the base ring, the lugs being interconnected annularly and the outer sides of the lugs being spaced from the adjacent inner face of the casing.

2. The combination of a flanged rim with a base ring formed of segmental sections that are adapted to engage on the rim when assembled and are transversely beveled, a casing of substantially inelastic fabric, the marginal portions of which are confined between the flanges and the sides of the ring which latter are outwardly inclined and extend for a considerable distance beyond the flanges and an annular elastic core consisting of an outer continuous portion having an outer contour conforming to the casing, and a plurality of radially disposed lugs on the inner face of the outer portion resting on the base ring, the lugs being interconnected by an annular rib likewise resting on the base ring, and the outer sides of the lugs and rib being spaced from the adjacent inside face of the casing.

3. The combination of a flanged rim, with a base ring adapted to engage on the rim and beveled transversely, the ring extending laterally and radially beyond portions of the rim flanges and normally cooperating with the rim as casing securing means, an annular core having an outer continuous portion and lugs inwardly extending therefrom that are connected by an annular rib, the inner diameter of the core being normally less than the outer diameter of the ring to the face of which the core corresponds in contour, whereby the core is under tension when mounted on the ring, and an outer casing of inelastic fabric enveloping the core and interlocking between the ring and flanges along the marginal portions thereof, the outer diameter of the core being normally greater than the inner diameter of the casing and the cross dimension of the lugs being less than that of the applied casing, whereby the core is under compression and spaced along its sides from the adjacent portions of the casing.

4. In a cushion tire the combination of a rim with a ring of substantially incompressible material mounted on the rim, an annular core of elastic material mounted on the ring, and a casing enveloping the core with the marginal portions retained between the sides of the ring and the rim, the ring and casing being proportioned to maintain both stress and compression on the core, and the core being dimensioned to provide clearance between the sides thereof and the marginal portions of the casing and the core constituting a minor portion in radial dimension thickness of the assembled structure.

5. In a tire construction, a casing, an annular core support formation having its external face formed with a cross-sectional configuration such as to produce a face including adjacent annular portions inclined in opposite directions to a circumferential plane of the wheel, the combined width of the annular portions being not less than the width of the base of the formation, and a yieldable core member consisting of an outer portion having an outer contour substantially conforming to the casing and an inner portion resting on the core support, the sides of the inner portion being spaced from the adjacent inner faces of the casing, whereby the load or stress applied will produce member displacement in directions substantially transverse to the direction of application.

6. In a tire construction wherein the casing is supported by a yieldable core member and a substantially non-yielding core support formation with the latter having a configuration to cause member displacement in directions substantially transverse to the direction of and in the presence of load or stress application on the tire, such yieldable core member having an outer contour in cross-section of the member adapted to conform to the opposing inner face of the casing when applied, and having a cross-section width on planes parallel to the supporting face of the support less than the distance between the opposing faces of the casing on such planes to provide spaces between the member and casing on opposite sides of the positioned member, said member having a normal diameter such as to produce a tension characteristic to the member when the latter is positioned on the support formation.

In testimony whereof I affix my signature in the presence of two witnesses.

GEORGE WILLIAM BELL.

Witnesses:
C. R. STICKNEY,
ANNA M. DORR.